United States Patent [19]

Kim

[11] Patent Number: 5,394,197
[45] Date of Patent: Feb. 28, 1995

[54] LOW-BAND CONVERSION CHROMINANCE SIGNAL PROCESSING APPARATUS AND METHOD THEREFOR

[75] Inventor: Yong-je Kim, Suwon, Rep. of Korea

[73] Assignee: Samsung Electronics Co., Ltd., Kyungki-do, Rep. of Korea

[21] Appl. No.: 158,826

[22] Filed: Nov. 29, 1993

[30] Foreign Application Priority Data

Nov. 27, 1992 [KR] Rep. of Korea ............ 92-22571

[51] Int. Cl.[6] ............................................. H04N 9/64
[52] U.S. Cl. ................................. 348/708; 348/539; 348/713
[58] Field of Search ............... 348/571, 536, 537, 539, 348/549, 638, 642, 708, 713; H04N 9/64; 358/21 R, 40

[56] References Cited

U.S. PATENT DOCUMENTS 4,811,085 3/1989 Idei ................................. 348/505

Primary Examiner—James J. Groody
Assistant Examiner—Sherrie Hsia
Attorney, Agent, or Firm—Sughrue, Mion, Zinn, Macpeak & Seas

[57] ABSTRACT

A chrominance signal processing apparatus, where a chrominance subcarrier and a low-band converting chrominance subcarder are formed, uses a common oscillating signal to form the low-band converting chrominance subcarrier. The low-band converting chrominance signal processing apparatus includes an oscillator for producing an oscillating signal having a predetermined frequency, a chrominance subcarder generator receiving the oscillating signal to produce a chrominance subcarrier, a chrominance demodulator demodulating the chrominance signal incorporated in a composite video signal, a chrominance subcarrier generator receiving the oscillating signal to produce the low-band converting chrominance subcarrier, and a chrominance modulator receiving the chrominance signal demodulated in the chrominance demodulator and the low-band converting chrominance subcarrier to produce the low-band converting chrominance signal. When the signal is processed in the NTSC system or the PAL system, the chrominance signal processing apparatus performs the chrominance signal process, using the oscillating signal. A method for chrominance signal processing is also described.

30 Claims, 7 Drawing Sheets

LOW-BAND CONVERSION CHROMINANCE SIGNAL PROCESSING APPARATUS AND METHOD THEREFOR

FIELD OF THE INVENTION

The present invention relates to a low-band conversion chrominance signal processing apparatus of a video tape recorder. More particularly, the present invention is related to a low-band conversion chrominance signal processing apparatus which forms a chrominance subcarrier and a low-band converting chrominance subcarrier using a common oscillating signal so as to perform the chrominance signal processing. A device for forming the low-band convening chrominance subcarrier used in the chrominance signal processing apparatus is also disclosed. A corresponding method is also disclosed.

The low-band converting chrominance signal processing apparatus according to the present invention can be adopted to standard recording systems (e.g., an eight millimeter system, a VHS system, and a beta system) in which the low-band converting chrominance signal is directly recorded. While several recording formats are supported by the present invention, the eight millimeter system will be discussed in the interest of brevity.

Korean Patent Application No. 92-22571 is incorporated herein by reference for all purposes.

BACKGROUND OF THE INVENTION

Generally, a video recorder records a luminance signal using a low-carrier FM recording method and records a chrominance signal using a low-band-conversion direct-recording method, as discussed in greater detail below.

Video signals are first separated into luminance signals and chrominance signals. The separated luminance signal is converted into an FM-modulated wave with a low carrier frequency. Here, selection of the frequency of the carrier wave corresponding to the white peak of the white level of a video signal and to the sync tip of a synchronizing signal is important in relation to a signal-to-noise ratio (S/N). The difference between the carrier's frequencies bracketed by the white peak of the white level and the sync tip of the synchronization signal represents a frequency deviation which should be maximized in order to get the most favorable S/N ratio, taking other conditions into account. This is because the frequency deviation is proportional to the amplitude of the output signal after demodulation. In the eight millimeter system, the white peak of the white level is 5.4 Mhz and the sync tip of the synchronization signal is 4.2 Mhz; the frequency deviation is 1.2 Mhz, accordingly. In the VHS system, the white peak of the white level is 4.4 Mhz and the sync tip of the synchronization signal is 3.4 Mhz, while in the beta system, the white peak of the white level is 4.8 Mhz and the sync tip of the synchronization signal is 3.6 Mhz.

The FM modulation characteristics in the video recorder are such that, even if the transmission zone of a magnetic tape and a video head system is narrow, the complete recording can be accomplished therein, and such that, even if the contact state of the magnetic tape and the video head is somewhat poor, the recording quality will still not be unacceptably degraded.

On the other hand, a chrominance signal whose frequency corresponds to 3.58 Mhz+500 Khz in an NTSC system is converted into the signal whose frequency is 743 Khz (629 Khz in the VHS system and 688 Khz in the beta system), which is lower than that of a luminance signal. The chrominance signal is recorded directly using AM modulation., Since the signal is converted into a lower band with respect to the luminance signal, the signal is called a low-band converting chrominance signal. Also, the chrominance subcarrier converted into a low band is called as a low-band converting chrominance subcarder.

The chrominance signal must be forcibly to be converted into a signal having a low frequency so that the recording zone can be used effectively. Also, since the chrominance signal itself is a phase-modulated wave, it is affected by the jitter due to the running imbalance between the magnetic tape and the video head system. Therefore, if the chrominance signal is converted into a signal having a low frequency, the phase-shifting depending on the same amount of the jitter is reduced so that the chrominance change can be prevented.

The low-band converting chrominance signal is incorporated with a low-carrier FM signal of the luminance signals, and the incorporated signal is supplied to the video head system and recorded on the magnetic tape. The low-carrier FM signal performs the alternating-current bias with respect to the low-band converting chrominance signal, so that no-bias recording can be achieved during video signal recording. When the recorded signal is reproduced, the signal is converted by the reverse of the process used in recording the signal, thus, restoring the original signal.

In the conventional device for forming a low-band converting chrominance signal, an oscillating signal having a frequency Fscu (a low-band converting chrominance subcarrier whose frequency is 47.25 Fh in the NTSC system and 46 7/8 Fh in the PAL system, where Fh is the frequency of an horizontal-synchronizing signal) output from the automatic frequency controller (AFC) by using a voltage controlled oscillator (VCO) and an oscillating signal having a frequency Fs (a chrominance subcarrier whose frequency is 455/2 Fh in the NTSC system and $284 - \frac{1}{4} + 1/625$ Fh in the PAL system) output from a local oscillator (VXO usually employed because of its good stability) are incorporated together at a subconverter which produces an incorporated signal of Fs+Fscu. Thereafter, the incorporated signal of Fs+Fscu is further incorporated in the main convertor with the Y/C-divided chrominance signal, that is, the chrominance signal modulated by Fs, which therefore produces a low-band converting chrominance signal.

It is also necessary for the conventional low-band converting chrominance signal generating device to have a VCO, which is used in the AFC circuit and the local oscillator.

Moreover, since the chrominance subcarrier and the low-band converting chrominance subcarrier in the NTSC and PAL systems do not have an integer multiplier for each other, there is a problem in that the NTSC/PAL video recorder requires separate VCO and VXO devices for each system.

SUMMARY OF THE INVENTION

Accordingly, to solve the problem, it is an object of the present invention to provide an improved low-band converting chrominance signal processing apparatus for the use in NTSC/PAL video recorders in which chrominance signals in the NTSC system and in the PAL system are processed using a common oscillating signal.

It is another object of the present invention to provide a method for forming a low-band converting chrominance subcarrier, using a common oscillating signal.

It is still another object of the present invention to provide a device for forming the low-band converting chrominance subcarder, using a common oscillating signal.

To accomplish the object, the present invention provides a low-band converting chrominance signal processing apparatus comprising:

an automatic frequency control circuit for producing an oscillating signal having a predetermined frequency;

a chrominance subcarrier generator receiving the oscillating signal for producing a chrominance subcarrier;

a chrominance demodulator for demodulating the chrominance signal modulated by the chrominance subcarrier, using the chrominance subcarrier;

a chrominance processor for processing the chrominance signal demodulated in the chrominance demodulator;

a low-band converting chrominance subcarrier generator for receiving the oscillating signal to produce a low-band converting chrominance subcarder; and a chrominance modulator for receiving the chrominance signal processed by the chrominance processor and the low-band converting chrominance subcarrier to thereby produce a chrominance signal modulated with the low-band converting chrominance subcarrier.

To accomplish another object, the present invention provides a method for forming a low-band converting chrominance subcarrier, the method comprising the steps of:

determining a frequency M of the low-band converting chrominance subcarrier and a frequency N of the oscillating signal which correspond to the period of one horizontal scanning line, and sampling the basic waveform of the low-band converting chrominance subcarrier at N sampling points each having uniform interval, so as to be stored in a form of a look-up table;

forming a read-address for the look-up table to be read M times during every N oscillating signals; and producing sampled values from the look-up table corresponding to the read-address, whereby M chrominance subcarriers are produced for every N oscillating signals.

To accomplish still another object, the present invention provides a method for forming a low-band converting chrominance subcarrier, the method comprising the steps of:

determining a frequency M of the low-band converting chrominance subcarrier and a frequency N of the oscillating signal which correspond to the period of one horizontal scanning line, and sampling the basic waveform of the low-band converting chrominance subcarrier at N sampling points each having a uniform interval, so as to be stored in a form of a look-up table;

repetitively counting the oscillating signal by the period of one horizontal scanning line, and thereby forming a read-address provided for the look-up table; and producing the sampled value from the look-up table corresponding to the read-address, whereby M low-band converting chrominance subcarriers are produced every N oscillating signals.

To accomplish still another object, the present invention provides a device for forming the low-band converting chrominance subcarrier, the device comprising:

a ROM for generating the low-band converting chrominance subcarrier, in which the values are stored that are sampled from the basic waveform of the low-band converting chrominance subcarrier by the frequency Fs of the oscillating signal corresponding to one period of a horizontal scanning line; and a read-address generator for generating a read-address according to which the ROM for generating the low-band converting chrominance subcarriers is repeatedly recovered a number of times as frequency Fscu of the low-band converting chrominance subcarrier in correspondence with the period of an horizontal scanning line, responsive to Fs oscillations.

To accomplish still another object, the present invention provides a device for forming a low-band converting chrominance subcarrier, which comprises:

an output portion for producing the values which are sampled from Fscu low-band converting chrominance subcarriers at Fs sampling points each having a uniform interval according to the frequency Fscu of the low-band chrominance subcarrier and the frequency Fs of the oscillating signal, the frequencies corresponding to the period of an horizontal scanning line;

an address generator for repetitively counting an oscillating signal by the period of a horizontal scanning line and thereby producing the read-address supplied for the look-up table; and a domain determinator.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinbelow, the present invention is explained in more detail in reference to the attached drawings.

Figure 1:
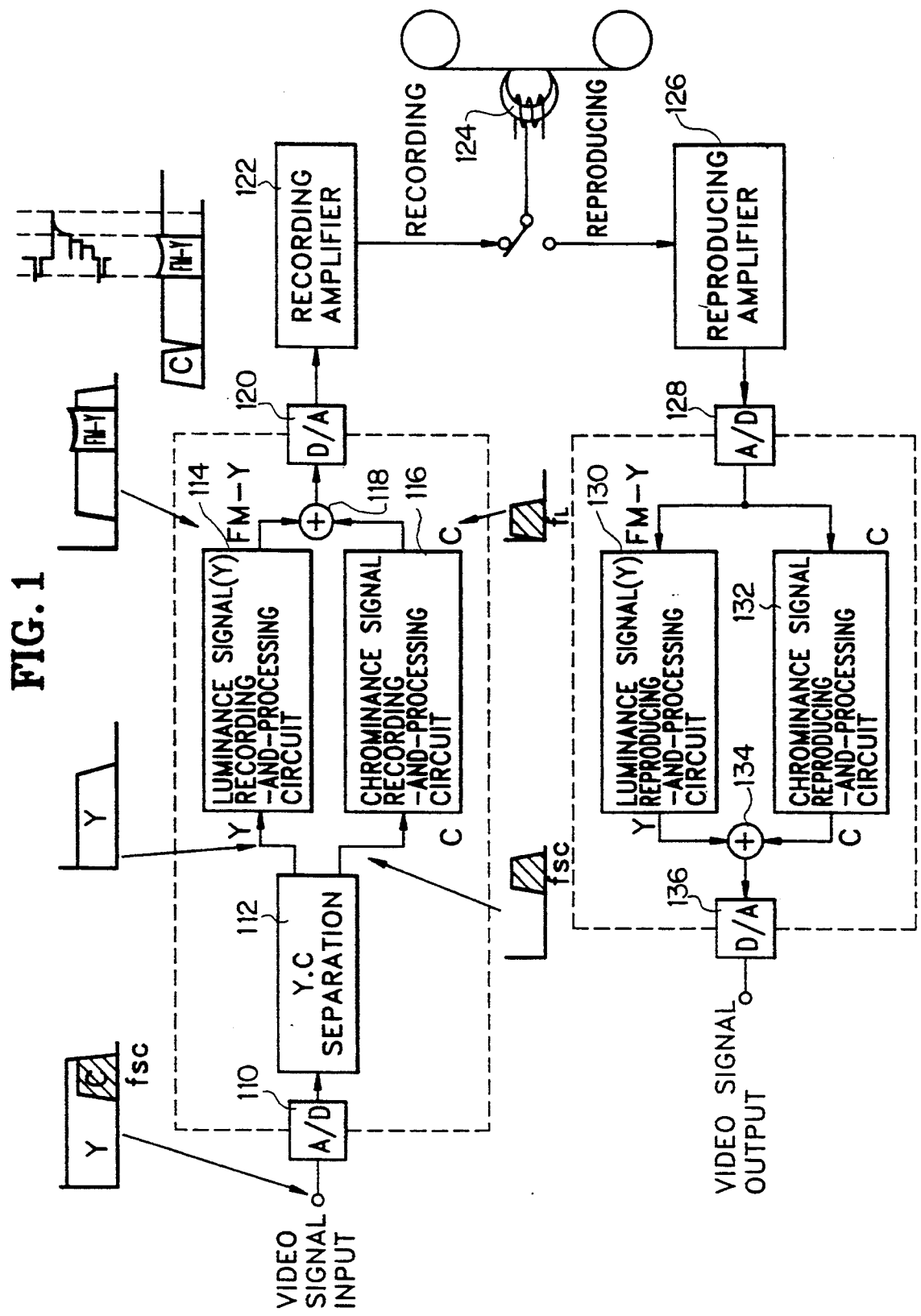
FIG. 1 is a block diagram showing a low-band conversion signal processing in a video recorder.

FIG. 1 is a block diagram illustrating the signal processing in a video recorder, e.g., digital processing. The device illustrated in FIG. 1 includes an A/D convening circuit 110 for convening a composite video signal into a digital signal; a luminance/chrominance (Y/C) separating circuit 112; a Y signal recording-and processing circuit 114 which performs a non-linear emphasis, a further emphasis, a clip procedure and an FM modulation; a chrominance signal recording-and-processing circuit 116 for frequency-converting the chrominance signal into a lower frequency band; a mixer 118 for superimposing an FM-modulated luminance signal FM-Y on a low-band converting chrominance signal C'; a D/A converter 120; a recording amplifier 122; and a recording/reproducing head 124.

Preferably, the signal recorded on the tape is transmitted through a recording/reproducing head 124, a reproducing amplifier 126, an A/D converter 128 for converting a reproduced signal into a digital signal, a luminance signal reproducing-and-processing circuit 130 for reproducing the luminance signal from FM-modulated luminanee signal FM-Y, a chrominance signal reproducing-and-processing circuit 132 for reproducing the chrominance signal from the low-band converted chrominance signal C', a mixer 134 for mixing the reproduced luminance signal Y with the reproduced chrominance signal C, and a D/A converter 136, whereby composite video signal is reproduced.

Figure 2:
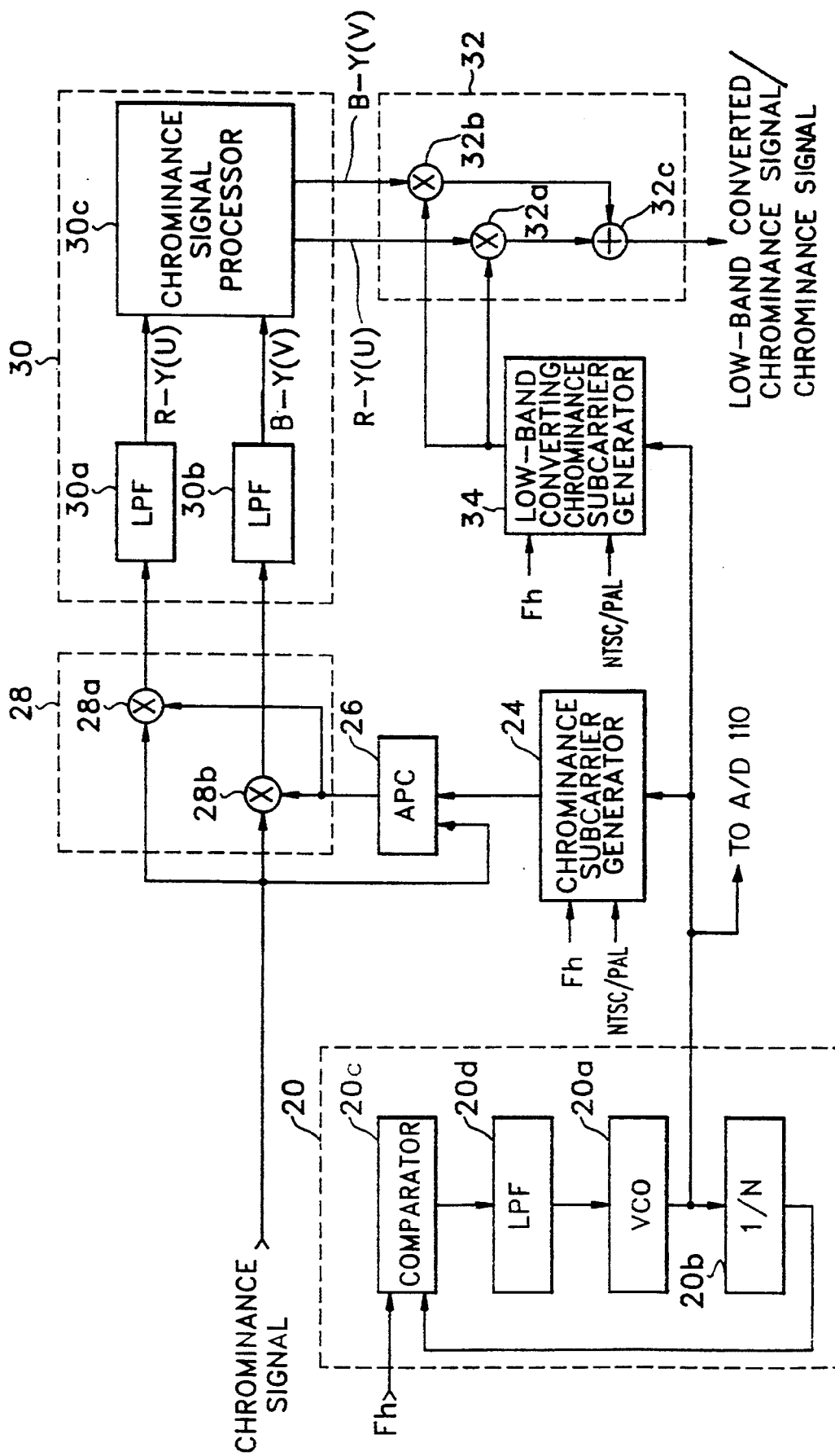
FIG. 2 is a block diagram illustrating an embodiment of a low-band conversion chrominance signal processing apparatus according to the present invention.

FIG. 2 is a block diagram showing a circuit which is advantageous for processing a low-band converting chrominance signal, according to an embodiment of the present invention. Preferably, a chrominance signal incorporated in a composite video signal is converted into a low-band chrominance signal. It will be appreciated that techniques for modulating the chrominance signal modulated by a chrominance subcarrier so as to reproduce the chrominance signal, for performing the reverse function thereof, or for performing a phase inverting function of a low-band converting chrominance subcarrier and the phase shift function thereof in order to reduce the crisscross in recording a signal on a tape. Therefore, those processes are not described in the interest of brevity.

Referring to FIG. 2, the low-band converting chrominance signal processing apparatus includes an AFC 20, a chrominance subcarrier generator 24, an automatic phase control (APC) circuit 26, a chrominance demodulator 28, a chrominance processor 30, a low-band converting modulator 32 and a low-band converting chrominance subcarrier generator 34. Preferably, AFC 20 includes a voltage controlled oscillator (VCO) 20a, a 1/N frequency divider 20b, a comparator 20c and a low-band filter 20d. VCO 20a controls the oscillating frequency according to the voltage applied thereto. VCO 20a advantageously generates 27 Mhz frequency, which is the common frequency in the NTSC system and the PAL system in a numeral 601 advised by International Ratio Consultative Committee. The oscillated output of VCO 20a is divided by 1/N frequency divider 20b and supplied to another input terminal of comparator 20c. A divisor N of 1/N frequency divider 20b advantageously is 1716 in the NTSC system and 1728 in the PAL system.

Preferably, a horizontal synchronizing signal Fh, separated by a synchronizing separator (not shown), is supplied to the other input terminal of comparator 20c. Comparator 20c detects the phase difference between signals applied to the two input terminals to produce a voltage corresponding to the phase difference, which is an error voltage. The error voltage is smoothed in low-pass filter 20d to feed back to VCO 20a, and then controls the frequency of the VCO signal.

The oscillating signal produced in VCO 20a of AFC 20 is supplied as a clock signal to the A/D converter for sampling the composite video signal, and at the same time, it is supplied for as a clock signal to chrominance subcarrier generator 24 and low-band converting chrominance subcarrier 34.

Chrominance subcarrier generator 24 receives the oscillating signal provided for from AFC 20, and forms a chrominance subcarrier to be supplied to APC circuit 26.

APC circuit 26 controls the chrominance subcarrier in chrominance subcarrier generator 24 so that the phase of the chrominance subcarrier is equal to that of the burst signal among the composite video signals, to supply the phase-controlled chrominance subcarrier for chrominance demodulator 28.

Chrominance demodulator 28 demodulates the chrominance signal included in the composite video signals using the chrominance subcarrier produced in chrominance subcarrier generator 24, so as to supply the demodulated chrominance signal to chrominance processor 30. Chrominance demodulator 28 includes modulators 28a and 28b.

Chrominance processor 30 includes low-band filters 30a and 30b for low-band-filtering color difference signals R-Y and B-Y (U/V in the PAL system) supplied from modulators 28a and 28b, and a chrominance signal processor 30c for receiving the low-band-filtered color difference signal and control its level during output to the chrominance signal modulator 32.

Chrominance modulator 32 includes modulators 32a and 32b and a mixer 32c, while it modulates the color difference signal provided from chrominance signal processor 30c according to the low-band converting chrominance subcarrier provided from low-band converting chrominance subcarrier generator 34, so as to produce the low-band converting chrominance signal.

Low-band converting chrominance subcarrier generator 34 receives the oscillating signal supplied from AFC 20 and forms the low-band converting chrominance subcarrier to be supplied to chrominance modulator 32.

Figure 3:
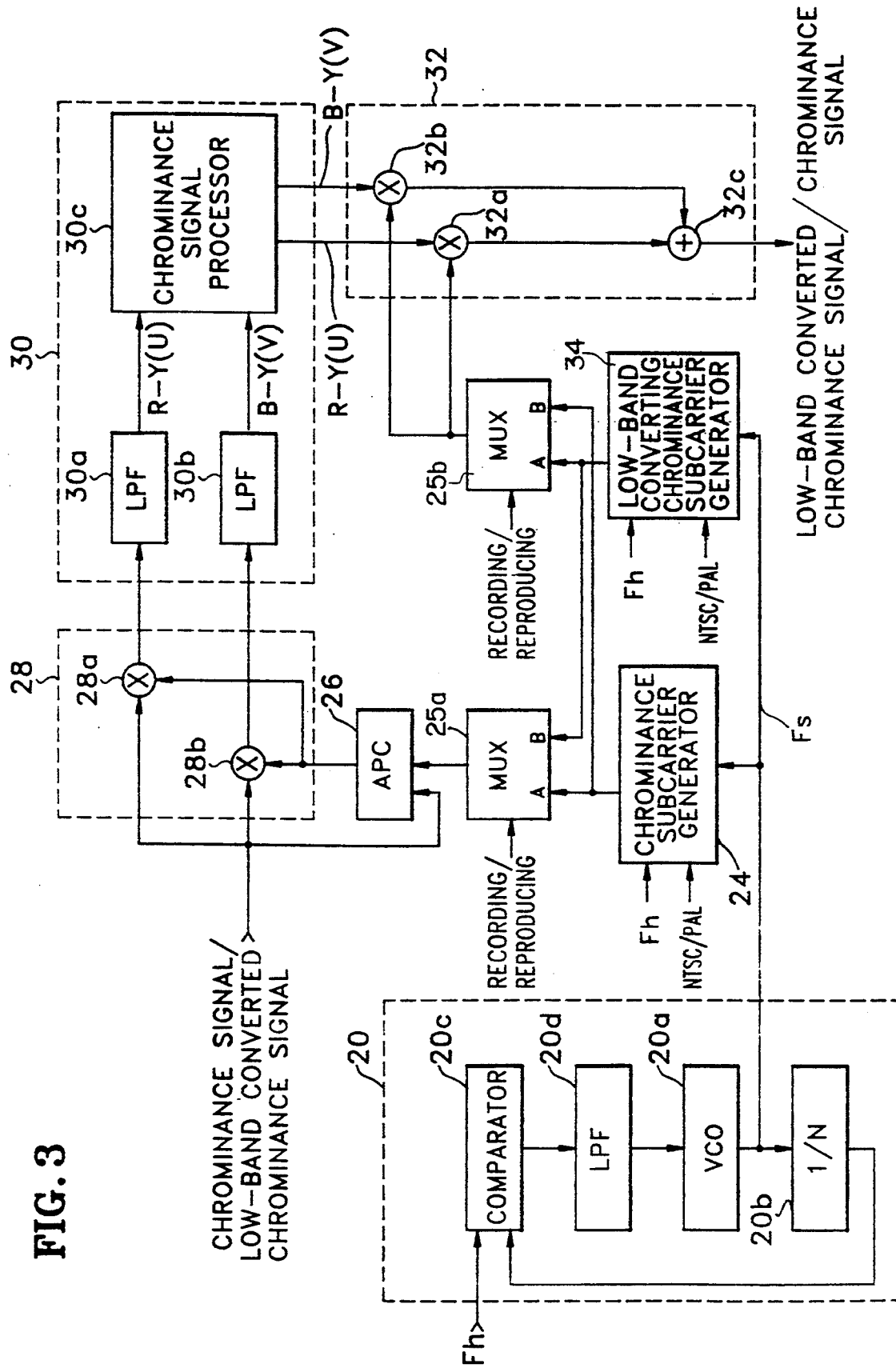
FIG. 3 is a block diagram illustrating another embodiment of the chrominance signal processing apparatus according to the present invention.

FIG. 3 shows another embodiment of the chrominance signal processing apparatus according to the present invention, in which a chrominance signal is converted into a low band or its reverse can be performed. Referring to FIG. 3, like components are denoted by the same reference numerals and are excused from the detailed description. The device illustrated in FIG. 3 further includes switch circuits 25a and 25b.

When a chrominance signal is converted into a low-band, that is, in the case of recording, first switch circuit 25a selects the chrominance subcarrier produced from chrominance subcarrier generator 24 to supply the selected subcarrier to chrominance demodulator 28, and second switch circuit 25b selects the low-band converting chrominance subcarrier produced in low-band converting chrominance subcarrier generator 34 to supply the selected subcarrier to chrominance modulator 32. As a result, the chrominance signal included in the composite video signal is converted in low-band.

When a low-band converted chrominance signal is converted into a chrominance signal, that is, in the case of reproduction, the first switch circuit 25a selects the low-band converting chrominance subcarrier produced by low-band convening chrominance subcarder generator 34 to supply the selected subcarrier to chrominance demodulator 28, and the second switch circuit 25b selects the chrominance subcarrier produced by chrominance subcarder generator 24 to supply the selected subcarrier to chrominance modulator 32. As a result, the low-band converted chrominance signal is demodulated into a chrominance signal and reproduced.

The operations of chrominance subcarrier generator 24 and low-band convening chrominance subcarrier generator 34 will now be described in more detail.

The method for forming the low-band convening chrominance subcarrier and the device thereof can be adopted wherever the chrominance subcarrier is produced, by the same principle.

In the video recorder of an eight millimeter or a high-band system, the frequency of the low-band converting chrominance subcarrier, i.e., Fscun in NTSC system or Fscup in PAL system is represented as follows, where the horizontal synchronizing frequency is expressed as Fh.

$$Fscun = 47.25\ Fh = 47.25\ Fh \times \frac{1000}{1001} \times 15{,}750\ Hz = 743.444\ KHz \quad (1)$$

$$Fscup = 46.875\ Fh = 46.874\ Fh \times 15{,}750\ Hz = 732.421\ KHz \quad (2)$$

Frequencies of the low-band convening chrominance subcarriers, Fscun and Fscup, are synchronized by horizontal synchronizing frequency Fh. However, as shown in Equations 1 and 2, the frequency of the low-band converting chrominance subcarrier is not produced as an integer with respect to the horizontal frequency, making it difficult to form the low-band converting chrominance subcarrier.

The relation between frequency Fs of the oscillating signal (858 Fh in the NTSC system and 864 Fh in the PAL system) and the frequency Fscu of the low-band converting chrominance subcarrier is as follows:

$$\frac{Fscun}{Fs} = \frac{Ts}{Tscun} = \frac{47.25\ Fh}{858\ Fh} = \frac{63}{1144} \quad (3)$$

$$\frac{Fscup}{Fs} = \frac{Ts}{Tscup} = \frac{46.875\ Fh}{864\ Fh} = \frac{125}{2304} \quad (4)$$

where equation (3) corresponds to the NTSC system while equation (4) relates to the PAL system, where Ts refers to the period of the A/D converted frequency, Tscun refers to the period of low-band converting chrominance subcarrier in the NTSC system, and Tscup refers to the period of low-band converting chrominance subcarrier in the PAL system.

In other words, Fs and the low-band converting chrominance subcarrier should have a relation as shown with respect to Equations 3 and 4. However, it is severely difficult to realize the relation using a logic circuit, e.g., a counter or other like devices. A method for forming the low-band converting chrominance subcarrier according to the present invention will now be described.

First, frequency M of the low-band converting chrominance subcarrier and frequency N of the VCO signal corresponding to one horizontal frequency are determined, and M low-band converting chrominance subcarriers are sampled at N sampling points, each having uniform interval so as to be stored in a look-up table.

Second, the VCO signal is counted to produce the read-address supplied to the look-up table.

Third, the sampled value corresponding to the read-address is recovered from the look-up table, so that M low-band converting chrominance subcarriers are produced every N oscillating signals.

According to the present invention, an embodiment of the method for forming the low-band convening chrominance subcarrier is that Equations 3 or 4 are substituted into the equation with respect to the power of two.

In the NTSC system, if displacing denominator 1144 in Equation 3 with 2048, that is $2^{11}$, numerator 63 changes to $112 \times (112/143)$. In the same way in the PAL system, if denominator 2304 in Equation 4 is displaced with 2048, numerator 125 becomes $112 \times (16/144)$.

That is, in case of the NTSC system, during 2048 periods of the oscillating signal, $112 \times (112/143)$ periods of the low-band converting chrominance subcarrier are produced. In other words, when a period of the low-band converting chrominance subcarrier is sampled into 2048 sampling points, the VCO signal is produced every $112 \times (112/143)$ sampling points.

Accordingly, a sine wave corresponding to one period of the low-band converting chrominance subcarrier is sampled at 2048 sampling points, and the sampled values are stored in a memory device, such as a read only memory (ROM), in a sequential order. Then, read-addresses are made to increase by $111 \times (112/143)$ per one period of the VCO signal, so that the low-band converting chrominance subcarrier is acquired which is exactly synchronized with the horizontal synchronizing frequency.

Since the read-address is quantized into $112 \times (112/143)$, the difference between the real address and the read-address, that is, an error, is generated in terms of less than one. However, if quantized address $112 \times (112/143)$ is accumulated each period of the oscillating signal and only the quotient of the accumulated value is taken, the error can be removed. Also, the error value appears regularly so that it can be ignored in a real-time application.

As for a sine wave, with only a quarter period thereof, remaining three quarters of the period of a sine waveform can be reconstructed. That is, when the sine wave form is divided into four periods where one period is 90°, the wave form of the second quarter is read in reverse with respect to that of the first quarter, and the waveforms of the third and fourth quarters are read with those of the first and second quarters; however, the signs of third and fourth quarters are reversed. Accordingly, if only one quarter of the sine wave form is stored in the memory space, the complete wave form can be reproduced, thus, memory space can be saved.

Since the sine waveform is sampled into 2048 sampled values, 512 times of sampling are performed during every quarter period. In this case, the number of sampling events is even, so that the sampled interval which is formed is uniform, e.g., the values corresponding to 0° and 90° preferably are not sampled. This is to prevent the error from being generated in reading the waveform reversely.

Figure 4:
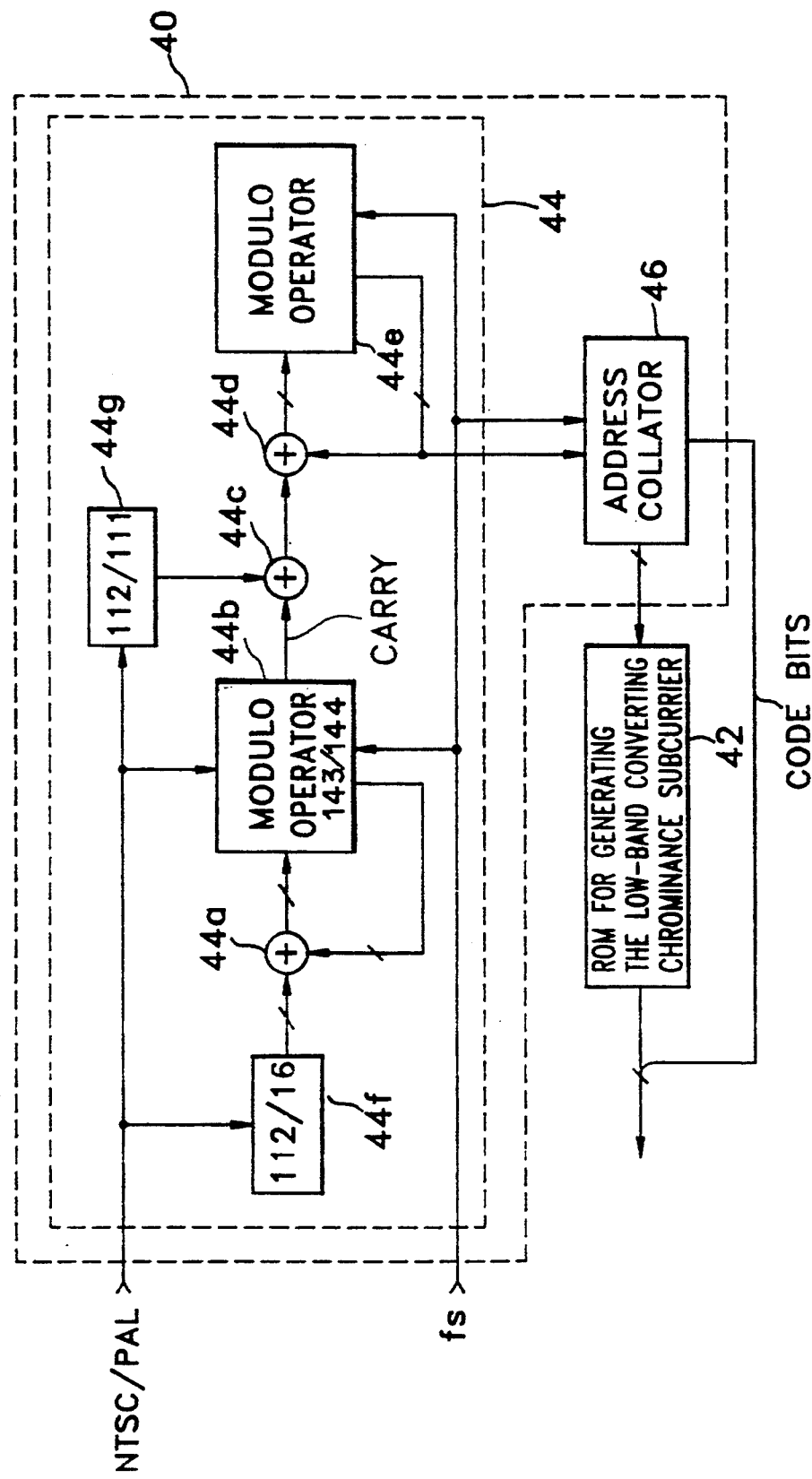
FIG. 4 is a block diagram showing an embodiment of the low-band converting chrominance subcarrier generator illustrated in FIGS. 2 and 3.

FIG. 4 is a block diagram illustrating an embodiment of low-band converting chrominance subcarrier 34 shown in FIGS. 2 and 3. Referring to FIG. 4, the low-band converting chrominance subcarrier generator 34 includes an address generator 40 and ROM 42 for generating a low-band converting chrominance subcarrier.

Address generator 40 includes an accumulator 44 having a first adder 44a, a first modulo calculator 44b, a second adder 44c, a third adder 44d, a second modulo calculator 44e and constant generators 44f and 44g; and an address collator 46.

The operation for forming the low-band converting chrominance subcarrier will now be described while referring to FIG. 4 for an exemplary NTSC system.

First adder 44a and first modulo calculator 44b perform the remainder in Equation 4, that is, 112/143. A numerator 112 produced in constant generator 44f is applied to one input terminal of first adder 44a, and the feedback value in first modulo calculator 44b is applied to the other input terminal thereof. Constant generator 44f produces a constant 112 in the NTSC system and 16 in the PAL system.

First adder 44a adds numerator 112 applied to one input terminal thereof and the feedback value in first modulo calculator 44b applied to the other input terminal thereof, to produce the result in first modulo calculator 44b. First modulo calculator 44b tests each received value; whenever the oscillating signal is applied to its clock terminal, so that in case that the detected value is more than the predetermined modulo value, the first modulo calculator produces a carry value and supplies it to the first output terminal. Calculator 44b also subtracts the modulo value from each received value and supplies the result as a feedback value for the second output terminal of adder 44a. The modulo value in first modulo calculator 44b is a denominator 143 of the remnant term of Equation 3 (in the PAL system, 144), and the oscillating signal is applied as a clock signal therein.

The carry value in first modulo calculator 44b is applied to one input terminal of second adder 44c, and quotient 112 in constant generator 44g is applied to the other input terminal thereof. Constant generator 44g produces a constant 112 in the NTSC system and 111 in the PAL system.

Second adder 44c adds the carry value in first modulo calculator 44b applied to its one input terminal and quotient 112 of Equation 3 applied to the other input terminal thereof, and outputs the result to third adder 44d.

Third adder 44d and second modulo calculator 44e perform the address operation. The output in second adder 44c is applied to one input terminal of first adder 44a, and the feedback value from second modulo calculator 44e is applied to the other input terminal thereof. Third adder 44d adds the output value from second adder 44c and the feedback value from second modulo calculator 44e, and outputs the result to second modulo calculator 44e. Second modulo calculator 44e tests every received value whenever the oscillating signal is applied to its clock terminal, and subtracts the modulo value from the received value, so that second modulo calculator 44e outputs the result as a feedback value and simultaneously supplies the result to address collator 46. The modulo value in second modulo calculator 44e is a sampling number, that is, 2048, and the VCO signal is applied as a clock signal.

Address collator 46 receives the address value from second modulo calculator 44e and produces a read-address suitable for ROM 42 for generating the low-band converting chrominance subcarrier and a code value.

ROM 42 for generating the low-band converting chrominance subcarrier stores the sampled values of a quarter period of a basic sine wave form. ROM 42 for generating the low-band converting chrominance subcarrier reads the value in the memory location corresponding to the received read-address, and produces the result. The output from ROM 42 for generating the low-band converting chrominance subcarrier is synthesized with the code value in address collator 46, so that the sampled value is obtained which corresponds to the address value in second modulo calculator 44e.

Figure 5:
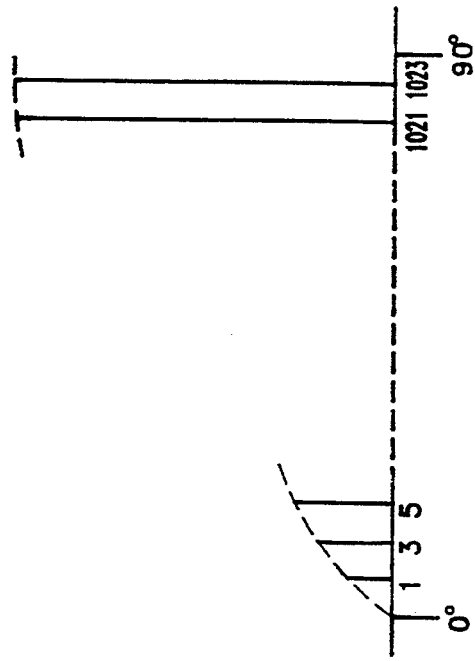
FIG. 5 is a graph showing the values stored in the ROM for generating the low-band converting chrominance subcarrier illustrated in FIG. 4.

FIG. 5 is a graph showing the values stored in the ROM for generating the low-band converting chrominance subcarrier using the circuitry illustrated in FIG. 4. When a quarter period of the sine wave is sampled into 512 samples, which are to be read inversely, an end-result is generated in that the reading of the values corresponding to 0° and 90° continues for one more value. In this case, if a quarter period of the sine wave is sampled into 1024 samples and the odd-numbered values are selected among the sampled values, the values corresponding to 0° and 90° are not sampled. Consequently, the end-result can be removed.

As for address collator 46, if the received address value corresponds to the first quarter period, the received address value is produced. If the address value corresponds to the second quarter period, it is subtracted from the final address value (1024), so that the result is produced. Preferably, if the address values corresponding to the third period and the last period are received, the address values corresponding to the first period and the second period respectively are produced but whose signs are reversed. Such an operation is performed repeatedly during every period of the sine wave.

Another embodiment of the method for forming the low-band converting chrominance subcarrier according to the present invention relates to the sharing of the horizontal synchronizing frequency Fh.

In the NTSC system, common denominator Fh in Equation 3 corresponds to the case where the number of oscillating signals is 858 and the number of low-band converting chrominance subcarriers is 47.25. That is, when 47.25 low-band converting chrominance subcarders are sampled into 858 sampled values, the oscillating signal is forcedly produced per 0.0550699 (47.25/858) period.

Accordingly, the sine wave corresponding to 47.25 periods of the low-band converting chrominance subcarder is sampled into 858 sampled points, and then the sampled points are stored in the serial address order in a memory device, e.g., ROM 42, and the read-address is increased by one for one every period of the oscillating signal and read, so that the low-band converting chrominance subcarrier can be obtained which is perfectly synchronized to the horizontal synchronizing frequency.

According to the operation of the components illustrated in FIG. 4, in the PAL system, the value applied to one input terminal of first adder 44a of address generator 40 is the numerator of the remainder term in Equation 4, which is 16, and the modulo value of first modulo calculator 44b is the denominator of the remainder term in Equation 4, which is 114, and the value applied to one input terminal of second adder 44c is the quotient of Equation 4, which is 11.

Figure 6:
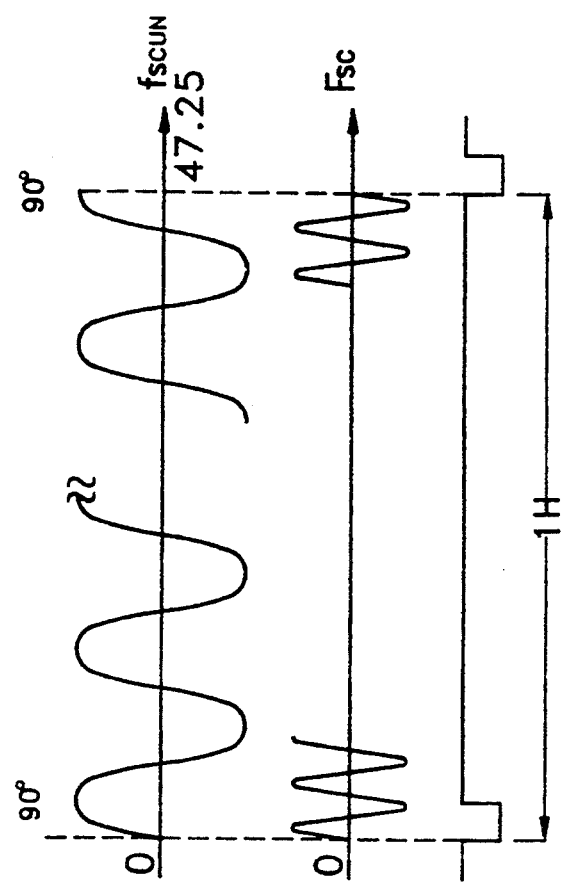
FIG. 6 is a waveform showing the relation of the horizontal synchronization signal, the low-band converting chrominance subcarrier and the oscillating signal in the NTSC system.

FIG. 6 is a waveform illustrating the relation of horizontal synchronizing signal Fh, the low-band converting chrominance subcarrier and the oscillating signal in the NTSC system. As illustrated in FIG. 6, 47.25 low-band converting chrominance subcarriers appear repeatedly within one period of the horizontal synchronizing signal (hereinafter referred to as 1H), and the end point thereof is equal to a quarter period of a low-band converting chrominance subcarrier, that is, 90°. Therefore, during the second 1H period, the values in the look-up table are read in the reverse order, and during the third 1H, the values in the look-up table are read in the original order and their sine values are reversed, and during the last 1H, the values are read and in the same manner as the second 1H, whose sine values are reversed. Such an operation is performed repeatedly every 4H period.

Figure 7:
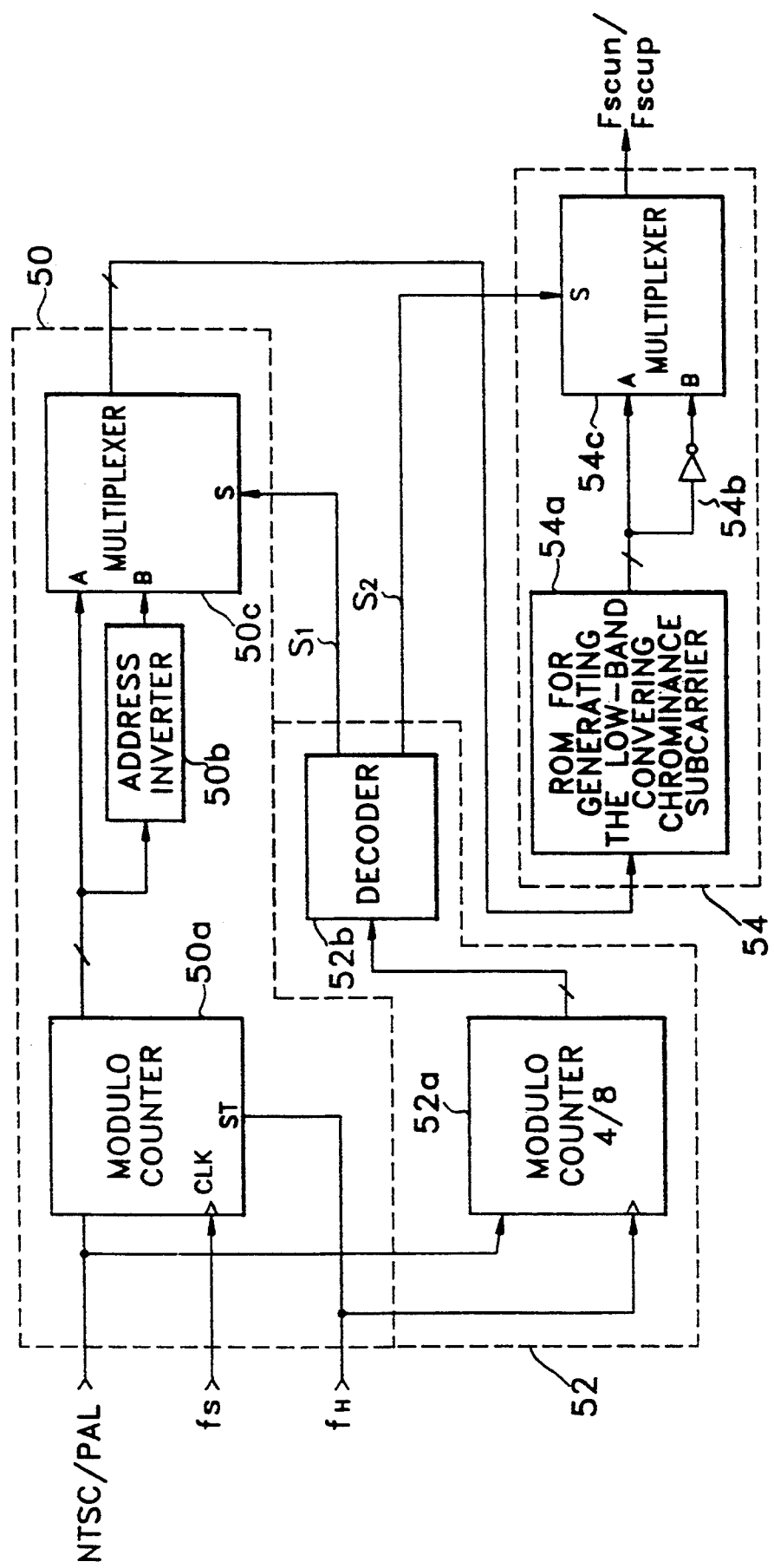
FIG. 7 is a block diagram illustrating another embodiment of the low-band converting chrominance subcarrier generator illustrated in FIGS. 2 and 3.

FIG. 7 is a block diagram showing still another embodiment of the device for forming the low-band converting chrominance subcarder according to the present invention. Referring to FIG. 7, the device includes an address generator 50, a domain determinator 52, and an output portion 54.

Address generator 50 includes a first modulo counter 50a, an address inverter 50b, and a first multiplexer 50c. First modulo counter 50a performs the modulo 858 operation in the NTSC system and the modulo 864 operation in the PAL system.

Domain determinator 52 includes a second modulo counter 52a and a decoder 52b. Second modulo counter 52a performs the modulo 4 operation in the NTSC system and the modulo 8 operation in the PAL system.

Output portion 54 includes a ROM 54a for generating the low-band converting chrominance subcarrier, an inverter 54b and a second multiplexer 54c.

Hereinbelow, the operation of the components illustrated in FIG. 7 is explained in case of the NTSC system. The oscillating signal produced by AFC 20 illustrated in FIG. 2 is applied to the clock terminal of first modulo counter 50a of address generator 50, and horizontal synchronizing signal Fh is applied to the reset terminal thereof. First modulo counter 50a counts the received oscillating signal and supplies the counted value for address inverter 50b and one input terminal of first multiplexer 50c. When the counted value equals the modulo value, the first modulo counter 50a starts to count from the reset value, again. The modulo value is 858 . First modulo counter 50a is reset in the leading edge of the horizontal synchronizing signal applied to the reset terminal.

In address inverter 50b, the received value therein becomes the complement value for the modulo value of the first modulo counter, and can be applied to the other input terminal of first multiplexer 50c. The output of first modulo counter 50a is applied to one input terminal of first multiplexer 50c, and the output of address inverter 50b is applied to the other input terminal of the first multiplexer 50c. First multiplexer 50c, responsive to the selected signal applied to the selecting input terminal, selects the output of first modulo counter 50a applied to one input terminal or the output of address inverter 50b applied to the other input terminal so that the selected output is supplied for output portion 54.

A first domain signal $S_1$ from domain determinator 52 is applied to the selecting input terminal of first multiplexer 50c. Horizontal synchronizing signal Fh is applied to the clock terminal of second modulo counter 52a of domain determinator 52. Second modulo counter 50b counts the received oscillating signal and supplies the result to decoder 52b. When the counted value equals the modulo value, the second modulo counter starts the counting from the reset value again. Here, the modulo value is 4.

Decoder 52b receives the counted result in second modulo counter 52a, to produce first domain signal $S_1$ assigning the first and second horizontal synchronizing signals, and second domain signal $S_2$ assigning the third and fourth horizontal synchronizing signals. The first domain signal $S_1$ is applied to the selecting input terminal of first multiplexer 50c in address generator 50, and the second domain signal $S_2$ is applied to the selecting input terminal of second multiplexer 54cof output portion 54.

The output signal of first multiplexer 50c is transmitted, as a read-address, to ROM 54a for generating the low-band converting chrominance subcarrier in output portion 54. ROM 54a for generating the low-band converting chrominance subcarrier reads the memory location corresponding to the received read-address therein, and supplies the restored value to one input terminal of second multiplexer 54c and to inverter 54b which inverts the received value therein to supply the inverted value to the other input terminal of second multiplexer 54c.

The output of ROM 54a for generating the low-band converting chrominance subcarrier is applied to one input terminal of second multiplexer 54c, and the output of inverter 54b is applied to the other input terminal of second multiplexer 54c . Second multiplexer 54c, responsive to the signal applied to its selecting input terminal selects one form of the output of ROM 54a for generating the low-band converting chrominance subcarrier, which is applied to one input terminal of the second multiplexer, and the output of inverter 54b, which is applied to the other input terminal and then produces the selected output. The selecting input terminal in second multiplexer 54c receives second domain signal $S_2$ of decoder 52b.

Referring to the operation of the components illustrated in FIG. 7, the structure of the look-up table in ROM 54a for generating the low-band converting chrominance subcarrier in the PAL system is somewhat different from that in the NTSC system, but the overall operation is similar. That is, as shown in Equation 4, one period (1H) of the horizontal synchronizing signal corresponds to 864 oscillating signals and 46.875 low-band converting chrominance subcarriers, and accordingly, the sampled state varies with it.

Figure 8:
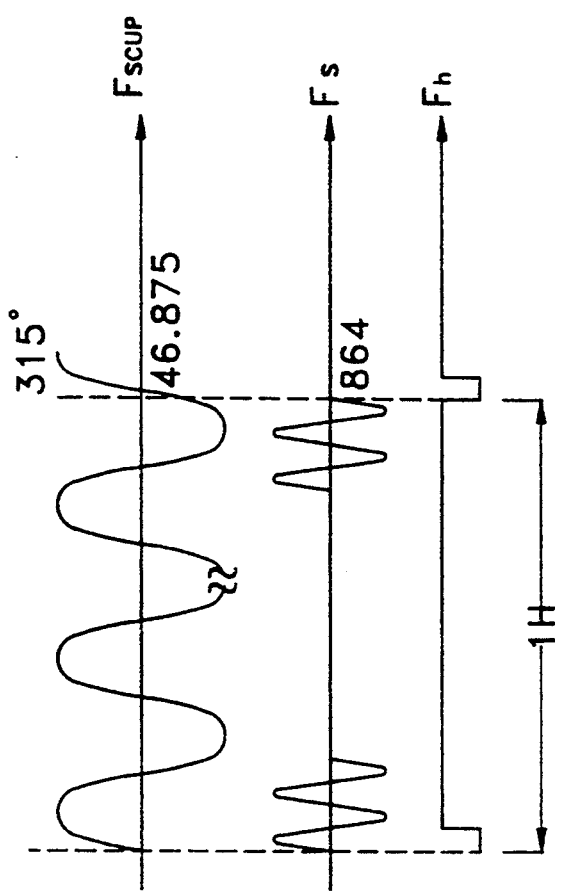
FIG. 8 is a waveform showing the relation of the horizontal synchronization signal, the low-band converting chrominance subcarrier and the oscillating signal in the PAL system.

FIG. 8 is a waveform showing the relation of horizontal synchronizing signal Fh, the low-band converting chrominance subcarrier, and the oscillating signal in the PAL system.

As illustrated in FIG. 8, low-band converting chrominance subcarriers repeatedly appear 46.875 times within 1H, and the ending point is identical to the 7/8 periods of a low-band converting chrominance subcarrier, that is, 315°. Therefore, the modulo values of first modulo counter 50a and second modulo counter 52a are 864 and 8, respectively, and therefore, decoder 52b is controlled according to those values.

As described above, the chrominance signal processing apparatus according to the present invention provides for an advantage in that chrominance signal processing can be performed using a common oscillating signal.

Also, according to the present invention, the device for forming the low-band converting chrominance subcarrier stores the basic wave form in a ROM and reads the stored wave form periodically, so as to form the low-band converting chrominance subcarrier. Therefore, irrespective of the ratio of the frequencies of the oscillating signal and the low-band converting chrominance subcarrier, the device can form the low-band converting chrominance subcarrier.

Furthermore, the device has the advantage that it can be adapted not only to the NTSC system but also to the PAL system, by changing the sampled state of the basic wave form memorized in the ROM.

The user skilled in a signal processing system will notice that, although only the method for forming the low-band converting chrominance subcarrier and the device thereof are described in the present specification, the chrominance subcarrier can also be formed by the same principle.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A low-band converting chrominance signal processing apparatus which receives a chrominance signal modulated by a chrominance subcarrier to produce a chrominance signal modulated by a low-band converting chrominance subcarrier, comprising:

an automatic frequency control circuit for generating an oscillating signal having a predetermined frequency;

a chrominance subcarrier generator for receiving said oscillating signal to thereby produce said chrominance subcarrier;

a chrominance demodulator for demodulating the chrominance signal modulated by said chrominance subcarrier, using said chrominance subcarrier;

a chrominance processor for processing the demodulated chrominance signal from said chrominance demodulator;

a low-band converting chrominance subcarrier generator for receiving said oscillating signal to thereby produce said low-band converting chrominance subcarrier; and a chrominance modulator for receiving the chrominance signal processed by said chrominance processor and said low-band converting chrominance subcarrier to thereby produce the chrominance signal modulated by said low-band converting chrominance subcarrier.

2. A low-band converting chrominance signal processing apparatus which receives a chrominance signal modulated by a chrominance subcarrier to produce the chrominance signal modulated by a low-band converting chrominance subcarrier or performs the reverse operation, respectively, comprising:

an automatic frequency control circuit for generating an oscillating signal having a predetermined frequency;

a chrominance subcarrier generator for receiving said oscillating signal to thereby produce the chrominance subcarrier;

a low-band converting chrominance subcarrier generator for receiving said oscillating signal to thereby produce the low-band converting chrominance subcarrier;

a chrominance demodulator for selectively demodulating the chrominance signal modulated by said chrominance subcarrier using said chrominance subcarrier, and demodulating the chrominance signal modulated by said low-band converting chrominance subcarrier using said low-band converting chrominance subcarrier;

a chrominance processor for processing the chrominance signal demodulated by said chrominance demodulator;

a chrominance modulator for modulating the chrominance signal processed by said chrominance processor, using said low-band converting chrominance subcarrier or said chrominance subcarrier, respectively;

a first switch for selecting one of said chrominance subcarrier and said low-band converting chrominance subcarrier and for supplying the selected chrominance subcarrier to said chrominance demodulator; and a second switch for selecting one of said low-band converting chrominance subcarrier and said chrominance subcarrier to thereby supply the selected chrominance subcarrier to said chrominance modulator, 3. The low-band converting chrominance processing apparatus as claimed in claim 1, wherein said low-band converting chrominance subcarrier generator comprises:

a ROM for generating said low-band converting chrominance subcarrier, storing therein a plurality of values which are equally sampled from a basic waveform of the low-band converting chrominance subcarrier into a frequency Fs of the oscillating signal corresponding to one period of a horizontal scanning line in sampled order; and an address generator for generating a read-address of said ROM, which is repetitively recovered a number of times of the frequency Fscu of the low-band converting chrominance subcarrier corresponding to the period of said one horizontal scanning line per said oscillating signal.

4. The low-band converting chrominance signal processing apparatus as claimed in claim 3, wherein said ROM and generating said low-band converting chrominance subcarrier stores the sampled values between 0° to 90° of the basic wave form of said low-band converting chrominance subcarrier are sampled the number of Fs/4 times.

5. The low-band converting chrominance signal processing apparatus as claimed in claim 3, wherein said address generator comprises:

an accumulator for accumulating therein Fscu/Fs per the oscillation signal; and an address collator for converting the output of said accumulator into an address suitable for said ROM for generating the low-band converting chrominance subcarrier.

6. The low-band converting chrominance signal processing apparatus as claimed in claim 5, wherein provided that a result of the Fscu/Fs is divided into a quotient and a remainder and the remainder is divided into a numerator and a denominator, said accumulator comprises:

a first constant generator for generating said numerator;

a second constant generator for generating said quotient;

a first adder for adding the numerator produced by said first constant generator to a feedback value produced by a first modulo calculator per the oscillating signal;

the first modulo calculator for performing the modulo operation on the output of said first adder using said denominator, to thereby supply a carry value for a second adder and feedback the remainder to said first adder;

said second adder for adding the quotient produced by said second constant generator to the carry value produced by said first modulo calculator;

a third adder for adding the output of said second adder to the remainder of a second modulo calculator; and the second modulo calculator for performing the modulo calculation on the output of said third adder by using Fs value to thereby supply the remainder as an address for said third adder and said address collator.

7. The low-band converting chrominance signal processing device as claimed in claim 5, wherein provided that said basic waveform of said low-band converting chrominance subcarrier is divided into four domains in which a first domain occupies from zero to 90°, a second domain occupies from 91° to 180°, a third domain occupies from 181° to 270°, and a fourth domain occupies from 271° to 360°, said address collator outputs an accumulated value as the read-address when the remainder of a modulo calculator belongs to the first domain; said address collator outputs a complement value of Fs/4 as the read-address when the remainder thereof belongs to the second domain; said address collator outputs the accumulated value subtracted by Fs/2 as the read-address when the remainder thereof belongs to the third domain; and said address collator outputs a second complement value of Fs/2 when the remainder thereof belongs to the fourth domain, said address collator generating a sine value having positive bits in the first and second domains and having inverted bits in the third and fourth domains.

8. The low-band converting chrominance signal processing apparatus as claimed in claim 1, wherein said low-band converting chrominance subcarrier generator comprises:

an output portion for producing values which are sampled from Fscu low-band converting chrominance subcarriers at Fs sampling points, each having an uniform interval, according to the relation between frequency Fscu of the chrominance subcarrier and frequency Fs of the oscillating signal which correspond to the period of one horizontal scanning line to thereby generating said low-band converting chrominance subcarrier;

an address generator for repetitively counting occurrences of the oscillating signal per period of the one horizontal scanning line to thereby form a read-address to be supplied to look-up table; and a domain determinator for generating a first domain signal applied to said address generator wherein said output portion is responsive to said read-address.

9. The low-band converting chrominance signal processing apparatus as claimed in claim 8, wherein said address generator comprises:

a first modulo counter for counting said oscillating signal with the modulo value of Fs;

an address inverter for complementing the counted value of said first modulo counter by Fs to produce a result; and a first multiplexer for selectively producing an output of said first modulo counter and an output of said address inverter according to a first domain signal applied to a selecting input terminal.

10. The low-band converting chrominance signal processing apparatus as claimed in claim 8, wherein said domain determinator comprises:

a second modulo counter for counting a horizontal synchronizing signal with a predetermined modulo value; and a decoder for receiving an output of said second modulo counter to thereby produce a first domain signal having inverted bits in a period of a first horizontal scanning line, and a second domain signal having inverted bits during the period of the first and a second horizontal scanning lines and during a period of third and fourth horizontal scanning lines, where a starting address in the period of the first horizontal scanning line is identical to position 0° of the low-band converting chrominance subcarrier.

11. The low-band converting chrominance signal processing apparatus as claimed in claim 8, wherein said output portion comprises:

a ROM for generating the low-band converting chrominance subcarrier, storing values which correspond to the sampled Fscu low-band converting chrominance subcarriers at the Fs sampling points, each having the uniform interval, in sampled order according to a relationship between the frequency Fscu of the low-band converting chrominance subcarrier and the frequency Fs of the oscillating signal corresponding to the period of the horizontal scanning line;

an inverter for inverting the output of said ROM for generating the low-band converting chrominance subcarrier; and a multiplexer for selectively providing one of the output of said ROM for generating the low-band converting chrominance subcarrier and an output of said inverter according to a second domain signal applied to a selecting input terminal.

12. A method for forming a low-band converting chrominance subcarrier using an oscillating signal having a predetermined frequency, said method comprising the steps of:

(a) determining a frequency Fscu of the low-band converting chrominance subcarrier and a frequency Fs of the oscillating signal corresponding to the period of one horizontal scanning line, and sampling a basic waveform of the low-band converting chrominance subcarrier at Fs sampling points each having an uniform interval to be stored in one form of a look-up table;

(b) producing read-addresses for said look-up table to be read Fscu times per Fs oscillating signals; and (c) generating sampled values corresponding to said read-address from said look-up table, whereby Fscu chrominance subcarriers are formed per the Fs oscillating signals.

13. A method for forming the low-band converting chrominance subcarrier as claimed in claim 12, wherein during step (a), said look-up table stores sampled values which are sampled from said low-band converting chrominance subcarrier from 0° to 90° Fs/4 times.

14. A method for forming the low-band converting chrominance subcarrier as claimed in claim 12, wherein during step (b), each Fscu/Fs is accumulated per the oscillating signal and in forming said read-addresses.

15. A method for forming the low-band converting chrominance subcarrier as claimed in claim 14, wherein an integer operation is performed with respect to accumulated values so as to produce said read-addresses.

16. A method for forming the low-band converting chrominance subcarrier as claimed in claim 14, wherein provided that the basic waveform of said low-band converting chrominance subcarrier is divided into four domains, in which a first domain occupies from 0° to 90°, a second domain occupies from 91° to 180°, a third domain occupies from 181° to 270°, and a fourth domain occupies from 271° to 360°, when a respective accumulated value belongs to the first domain, said step (b) provides said accumulated value as the read-address; when said accumulated value belongs to the second domain, said step (b) provides a complement value of Fs/4; when said accumulated value belongs to the third domain, said step (b) provides the accumulated value subtracted by Fs/2; and when said accumulated value belongs to the fourth domain, said step (b) provides a complement value of Fs/2.

17. A method for forming the low-band converting chrominance subcarrier as claimed in claim 14, wherein provided that the basic waveform of said low-band converting chrominance subcarrier is divided into four domains, in which a first domain occupies from 0° to 90°, a second domain occupies from 91° to 180°, a third domain occupies from 181° to 270°, and a fourth domain occupies from 271° to 360°, said step (c) provides the sampled values recovered from said look-up table for the first and the second domains, and the sampled values recovered from said look-up table and inverted for the third and the fourth domains.

18. A method for processing a low-band converted chrominance signal, said method comprising the steps of:
(a) determining a frequency Fscu of a low-band converting chrominance subcarrier and a frequency Fs of an oscillating signal corresponding to a period of one horizontal scanning line, and sampling a basic waveform of the low-band converting chrominance subcarrier at Fs sampling points each having uniform interval to be stored in a look-up table;
(b) producing a read-address for said look-up table to be read Fscu times per Fs oscillating signals; and
(c) producing a respective sampled value corresponding to said readaddress from said look-up table,
whereby Fscu low-band converting chrominance subcarriers are provided per the Fs oscillating signals.

19. A device for forming a low-band converting chrominance subcarrier using an oscillating signal, comprising:
a ROM for generating the low-band converting chrominance subcarrier, storing values which are uniformly sampled from a basic waveform of the low-band converting chrominance subcarrier by a frequency Fs of said oscillating signal corresponding to a period of one horizontal scanning line; and
a read-address generator for producing a read-address for said ROM for generating said low-band converting chrominance subcarrier repeatedly reading a number of times as frequency Fscu of the low-band converting chrominance subcarrier in correspondence with the period of one horizontal scanning line responsive to Fs oscillating signals.

20. The device for forming the low-band converting chrominance subcarrier as claimed in claim 19, wherein said ROM for generating the low-band converting chrominance subcarrier has values which are sampled from the basic wave form of said low-band converting chrominance subcarrier within 0°–90° Fs/4 times.

21. The device for forming the low-band converting chrominance subcarrier as claimed in claim 19, wherein said read-address generator comprises:
an accumulator for accumulating each Fscu/Fs per the oscillating signal; and
an address collator which converts an output of said accumulator into the readaddress suitable for said ROM for generating the low-band converting chrominance subcarrier.

22. The device for forming the low-band converting chrominance subcarrier as claimed in claim 21, wherein said accumulator comprises:
a first constant generator for producing a numerator, while a result of said Fscu/Fs is divided into a quotient and a remainder and then the remainder is divided into the numerator and a denominator;
a second constant generator for producing said quotient;
a first adder for adding the numerator produced from said first constant generator per the oscillating signal to a feedback value of a first modulo calculator;
the first modulo calculator which performs a first modulo operation on an output of said first adder with said denominator to thereby output a carry value to a second adder and feedback the remainder to said first adder;
the second adder for adding the quotient produced in said second constant generator to the carry value of said first modulo calculator;
a third adder for adding an output of said second adder to the remainder of a second modulo calculator; and
the second modulo calculator for performing a second modulo operation on an output of said third adder with Fs value, to supply the remainder for the third adder and said address collator as an address.

23. The device for forming the low-band converting chrominance subcarrier as claimed in claim 21, wherein provided that the basic waveform of said low-band converting chrominance subcarrier is divided into four domains, in which a first domain occupies from 0° to 90°, a second domain occupies from 91° to 180°, a third domain occupies from 181° to 270°, and a fourth domain occupies from 271° to 360°, when the remainder in said second modulo calculator belongs to the first domain, said address collator outputs an accumulated value as the read-address; when the remainder belongs to the second domain, said address collator outputs a first complement value of Fs/4; when the remainder belongs to the third domain, said address collator outputs the accumulated value subtracted by Fs/2; and when the remainder belongs to the fourth domain, said address collator outputs a second complement value of Fs/2, said address collator generating a sine value having bits in the first and second domains and having inverted bits in the third and fourth domains.

24. A method for forming a low-band converting chrominance subcarrier using an oscillating signal having a predetermined frequency, said method comprising the steps of:
   (a) determining a frequency Fscu of the low-band converting chrominance subcarrier and a frequency Fs of the oscillating signal corresponding to a period of one horizontal scanning line, and sampling and storing Fscu low-band converting chrominance subcarriers at Fs sampling points each having uniform interval to thereby form a look-up table;
   (b) repetitively counting the oscillating signal per the period of one horizontal scanning line to form a read-address which is supplied to said look-up table; and
   (c) producing sampled value corresponding to said read-address from said look-up table,
   whereby Fscu low-band converting chrominance subcarriers are formed per Fs oscillating signals.

25. The method for forming the low-band converting chrominance subcarder as claimed in claim 24, wherein said step (b) forms the address in an order that an address of the present period of horizontal scanning line is reversely designated to that of a previous period of horizontal scanning line.

26. The method for forming the low-band converting chrominance subcarrier as claimed in claim 25, wherein, provided that a starting address in the period of a first horizontal scanning line is located on position 0° of the low-band converting chrominance subcarrier, said step (c) repetitively provides the sampled value read from said look-up table during a first period of the first and a second horizontal scanning lines, and the value read in said look-up table and having an inverted sign during a second period of a third and a fourth horizontal scanning lines.

27. A device for forming a low-band converting chrominance subcarrier using an oscillating signal having a predetermined frequency, comprising:
   an output portion for producing values which are sampled from Fscu low-band converting chrominance subcarriers at Fs sampling points each having an uniform interval according to a frequency Fscu of the low-band chrominance converting subcarrier and a frequency Fs of the oscillating signal, wherein the respective frequencies correspond to a period of one horizontal scanning line to thereby generating said low-band converting chrominance subcarrier;
   an address generator for repetitively counting occurrences of the oscillating signal by the period of one horizontal scanning line to thereby form a read-address which is supplied to a look-up table; and
   a domain determinator for generating a first domain signal applied to said address generator, wherein said output portion is responsive to said read address.

28. The device for forming the low-band converting chrominance subcarrier as claimed in claim 27, wherein said address generator comprises:
   a first modulo counter for counting said occurrences of said oscillating signal with a modulo value of Fs;
   an address inverter for complementing a counted value from said first modulo counter with number Fs, to thereby produce a complemented value; and
   a first multiplexer for selectively providing one of an output of said first modulo counter and an output of said address inverter according to said first domain signal applied to a selecting input terminal.

29. The device for forming the low-band converting chrominance subcarrier as claimed in claim 27, wherein said domain determinator comprises:
   a modulo counter for counting a horizontal synchronizing signal with a predetermined modulo value; and
   a decoder for receiving an output of said modulo counter to thereby produce said first domain signal having reverse bits in the period of each horizontal scanning line, and a second domain signal having reverse bits during first and second horizontal scanning lines and during third and fourth horizontal scanning lines, respectively, when a starting address in the period corresponding to the first horizontal scanning line is located on position 0° of the low-band converting chrominance subcarrier.

30. The device for forming the low-band converting chrominance subcarrier as claimed in claim 27, wherein said output portion comprises:
   a ROM for generating the low-band converting chrominance subcarrier, storing said values sampled from the Fscu low-band converting chrominance subcarriers at the Fs sampling points each having the uniform interval, according to a relationship between the frequency Fscu of the low-banal converting chrominance subcarrier and the frequency Fs of the oscillating signal corresponding to the period of one horizontal scanning line;
   an inverter for inverting an output of said ROM for generating the low-band converting chrominance subcarrier; and
   a multiplexer for selectively providing one of the output of said ROM for generating the low-band converting chrominance subcarrier and an output of said inverter, according to a second domain signal applied to a selecting input terminal.

* * * * *